US006588971B2

(12) United States Patent
Welch et al.

(10) Patent No.: US 6,588,971 B2
(45) Date of Patent: Jul. 8, 2003

(54) FASTENER CLIP ASSEMBLY AND JOINT STRUCTURE USING SAME

(75) Inventors: Montgomery J. Welch, Spring Lake, MI (US); Kevin M. Wigger, Fruitport, MI (US)

(73) Assignee: Modular Systems, Inc., Fruitport, MI (US)

( * ) Notice: Subject to any disclaimer, the term of this patent is extended or adjusted under 35 U.S.C. 154(b) by 0 days.

(21) Appl. No.: 09/946,019

(22) Filed: Sep. 4, 2001

(65) Prior Publication Data

US 2003/0044232 A1 Mar. 6, 2003

(51) Int. Cl.[7] .............................. F16B 9/00; F16B 11/00
(52) U.S. Cl. ...................... 403/388; 403/254; 403/385; 403/386; 24/669; 292/177
(58) Field of Search ........................ 24/669, 670, 702; 403/331, 385, 386, 231, 388, 254, 316; 52/713, 714, 584.1, 511, 756, 285, 582; 292/80, 87, 81, 177, 178, 179, 180, 182, DIG. 16

(56) References Cited

U.S. PATENT DOCUMENTS

| 1,533,724 A | 4/1925 | Clarke-James |
| 3,451,362 A | 6/1969 | Ostling et al. |
| 3,491,820 A | 1/1970 | Ostling |
| 3,634,983 A | 1/1972 | Welch |
| 3,645,162 A | 2/1972 | Welch |
| 3,894,377 A | 7/1975 | Welch |
| 3,996,718 A | 12/1976 | Welch |
| 4,178,047 A | 12/1979 | Welch |
| 4,332,205 A | 6/1982 | Corl, Jr. |
| 4,470,716 A | 9/1984 | Welch |
| 4,473,316 A | 9/1984 | Welch |
| 6,109,819 A | 8/2000 | Welch |

FOREIGN PATENT DOCUMENTS

| AT | 18875 | 1/1905 |
| AT | 163663 | 7/1949 |
| BE | 712235 | 7/1968 |
| CH | 380908 | 9/1964 |
| FR | 1399609 | 4/1965 |

Primary Examiner—Gregory J. Binda
Assistant Examiner—Victor MacArthur
(74) Attorney, Agent, or Firm—Van Dyke, Gardner, Linn & Burkhart, LLP

(57) ABSTRACT

A fastener clip assembly for forming a substantially concealed joint between panels of furniture, a shelf assembly or the like includes a pair of clips telescopingly assembled with one another to form a joint which prevents rotation between the clips and joint members. The clips are secured to respective joint members and assembled with a portion of the second clip received through the slot of the first clip such that offset engagement sections overlap one another while a resilient, flexible inclined section on at least one, but preferably both, of the engagement sections draws the clips and joint members together. An engaging member which resists disassembly of the clips may be included.

68 Claims, 9 Drawing Sheets

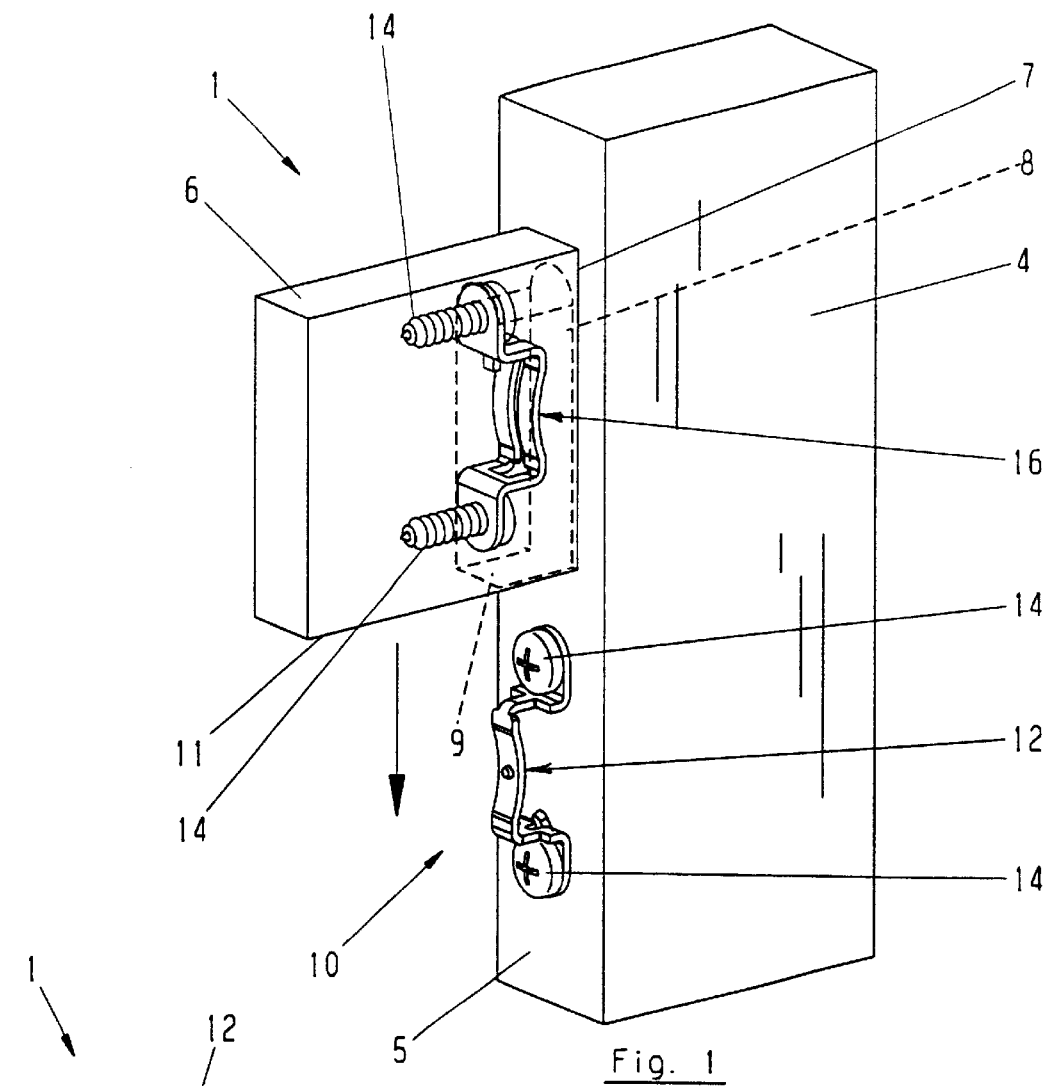
Fig. 1
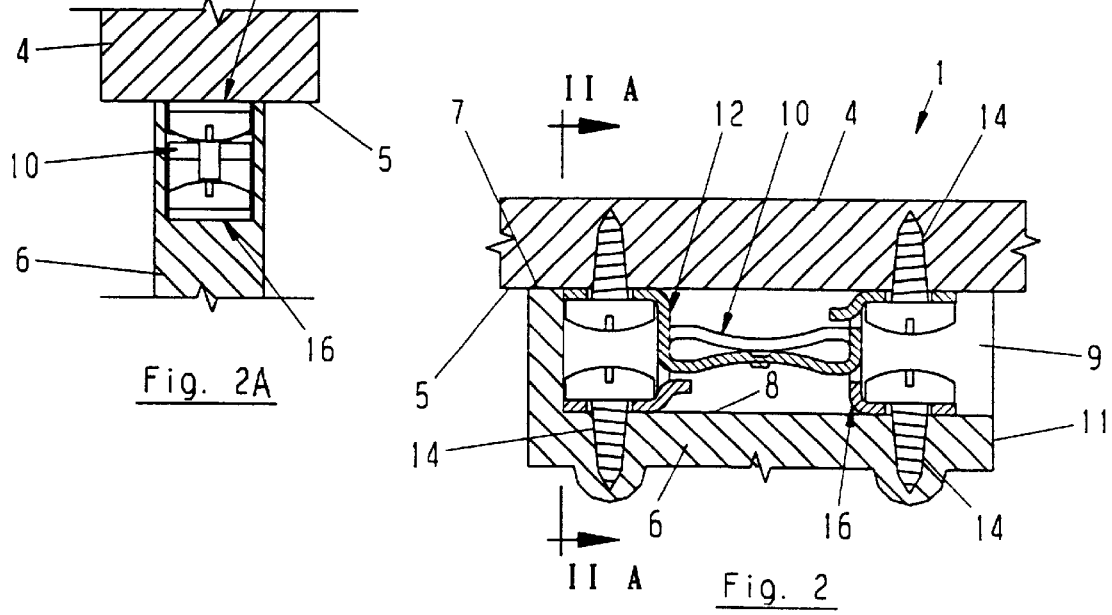
Fig. 2A
Fig. 2

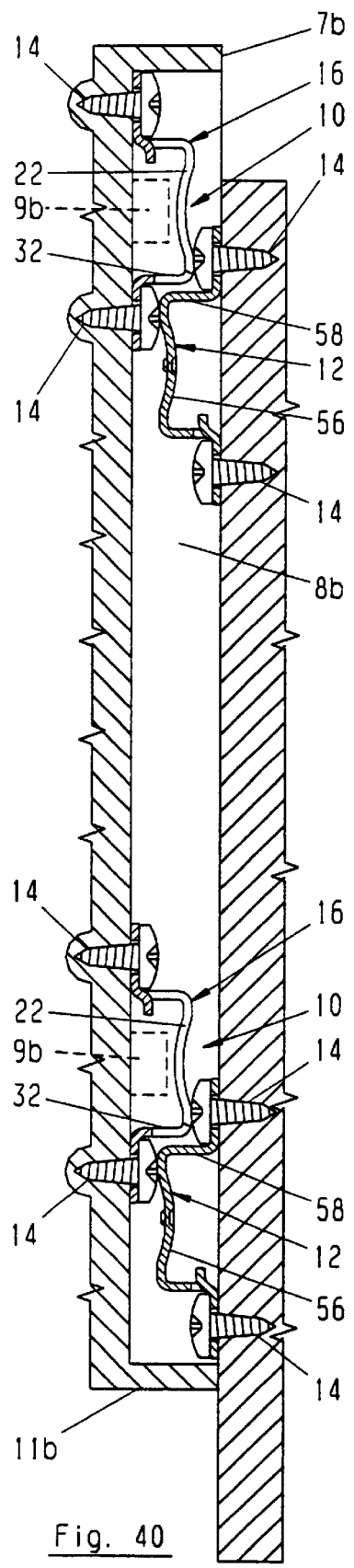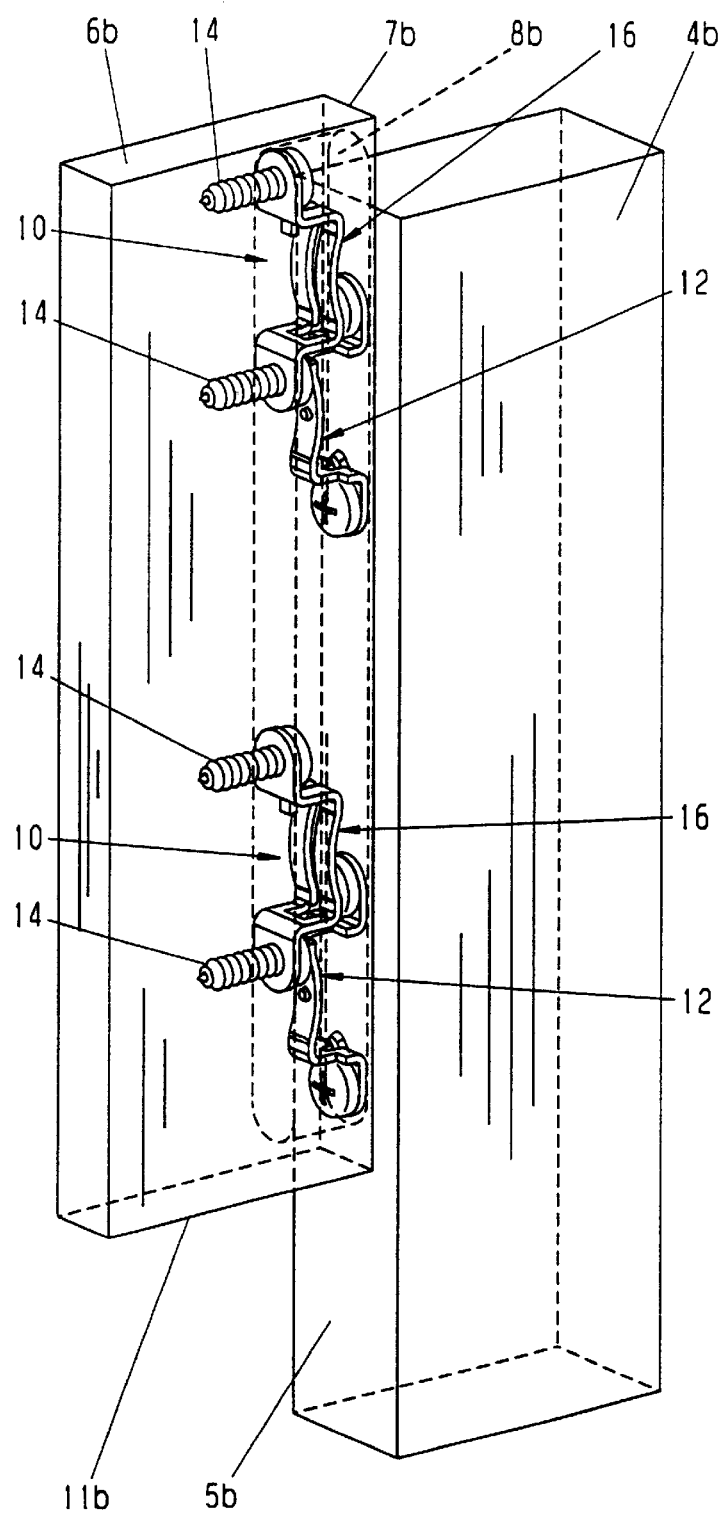
Fig. 40
Fig. 39

FASTENER CLIP ASSEMBLY AND JOINT STRUCTURE USING SAME

BACKGROUND OF THE INVENTION

This invention relates generally to fastening systems for joining one joint member or panel or another joint member or panel such as in furniture, shelving, storage bins, racks, phone booths, room space dividing panels, decorative panels, frames, storage assemblies or the like, and more particularly, to a fastener clip assembly for forming a joint between joint members or panels for such structures.

Many joints, such as between modern furniture parts, are fastened together by concealed mechanical connectors. Many of these concealed fasteners employ keyhole type slots and stud-like fasteners. Generally, this type of fastening system includes short recessed areas along the edges of the joint members such as furniture panels to be joined together. One or more fasteners are mounted within the recessed area of one joint member or furniture piece and a stud is mounted on the other. The fastener engages the head of the stud in a keyhole slot, then seats the stud to firmly engage the separate joint members or furniture panels. See, for example, U.S. Pat. Nos. 6,109,819; 4,473,316; 4,470,716; 4,332,205; and 4,178,047.

While functioning well to securely join the two joint members or furniture panels together in a secure joint, many prior systems have been prone to encounter rotation during assembly of the panels since the securing stud is typically mounted on an exposed surface even though the fastener clip receiving that stud is secured in a recessed pocket. Typically, there is no structure on the securing stud for engagement with the receiving clip to prevent rotation between the joint panels. A proposed solution to this drawback has been to secure the stud in the recessed pocket and place the receiving clip on an exposed surface of the opposite panel. In such case, the walls of the recessed pocket serve to confine and prevent significant rotation of the fastener clip when joined with the securing stud. However, unless precisely aligned, the clip can engage the walls of the pocket and, when significant force is applied such as is needed to fully assembly the fastener clip and securing stud, misalignment can break the walls of the pocket and damage the panel joint. Alternately, application of excessive force can also break the pocket walls.

Yet another solution to the rotation problem has been to provide an extra long recessed pocket in which a pair of fastener clips are mounted end to end for engagement with a pair of spaced securing studs. Hence, when the pair of studs is received in the aligned clips, rotation between the joint panels is prevented. However, this solution in effect doubles the cost of the required joint by adding a second securing system even though a single system would have sufficient strength to hold the panel members together to adequately hold the panel members. In addition, this solution requires a large amount of additional space for mounting the fasteners thereby preventing use in confined areas or where extra length is not available.

Yet another problem has been a lack of strength in prior fastener systems due to the inclusion of a single securing stud or fastener screw engaging an opposing fastener clip. When strong forces are applied to the joint members, the threads of the single securing screw bear the entire force of retaining the joint together. Hence, premature failure of such joints has been encountered when the joints are subject to strong forces.

Accordingly, the need exists in the furniture and other industries for a fastener system which prevents rotation between the joined parts or panels and minimizes damage to those joint members or panels while providing the benefits of increased strength, substantial concealment of the joint to provide a finished appearance, or to prevent vandalism, as well as ease of assembly, ease of use in automatic feed/manufacturing systems, and ease of disassembly in applications requiring same.

SUMMARY OF THE INVENTION

Therefore, the present invention provides an improved fastener system and joint structure incorporating same which provides a strong, secure joint which can be easily assembled while alternately providing ease in disassembly where desired, while preventing rotation between the joined clip and joint members in a manner which avoids damage to the joint members.

In one embodiment, the invention is a clip assembly for forming a joint structure to secure a first joint member to a second joint member, the clip assembly comprising a first clip having at least one and preferably a pair of spaced first mounting portions for attachment to the first joint member and a second clip adapted for attachment to the second joint member and for assembly with the first clip. The first clip includes a first engagement section offset from and connected to the first mounting portion or portions and a slot extending along the engagement section. The slot has a first portion with a predetermined width. The second clip has at least one, and preferably a pair of spaced second mounting portions, a second engagement section offset from and connected to the second mounting portion or portions, and at least one portion of the second engagement section having a width greater than the first portion of the slot. At least one of the first and second engagement sections has a resilient, flexible, inclined area. When the first clip is assembled to the first joint member, and the second clip is assembled to the second joint member, and the second clip is assembled to the first clip through the slot of the first engagement section, the first and second engagement sections engage one another with one portion of the second engagement section overlying the slot of the first engagement section while the resilient, flexible inclined area urges the clips and first and second joint members toward one another to form a tight, secure joint.

Preferably, each of the first and second engagement sections is a resilient, flexible inclined area such that the inclined areas engage one another upon assembly of the clips. These inclined areas may be arcuate, curved portions having intermediate apexes which engage one another upon assembly.

Either the engagement sections themselves or the overall clips may be formed from spring steel or another flexible, resilient material which returns to its original configuration when disassembled. The mounting portions may preferably comprise coplanar mounting flanges connected to opposite ends of each engagement section by upstanding legs. One of the legs on the second clip may be narrower than the other leg and have a width less than that of the slot such that the narrower leg may be received through the slot when the clips are telescoped together for assembly.

In other aspects, portions of the slot may be narrowed, or portions of the connecting legs between the mounting flanges and the engagement sections may be widened, to provide a wedging action upon assembly to further prevent rotation between the clips and the resulting joint.

In yet further aspects of the invention, the clips may be formed in semi locking or locking versions. In the semi locking version, the slot includes a tapered slot section through which a portion of the second clip is received during assembly, the tapered slot section resisting disassembly when the clips are fully assembled.

In the locking version, a locking member is provided on the first clip for engaging a receiving portion on the second clip to resist disassembly when the clips are fully assembled. In various forms, the locking member may be a locking flange extending from a position spaced from the first engagement section toward the first engagement section, while a portion of the second clip may include a receiving area engaged by a free end of the locking flange. Variations of the receiving area may include a raised protrusion extending outwardly from the second engagement area, a plurality of spaced protrusions on the second engagement area, or an aperture in the second engagement area of the first clip.

In another form of the invention, the clip assembly of the present invention includes a first clip and a second clip as described above, along with an engaging member on at least one of the first and second clips. The engaging member engages a portion of the other of the first and second clips when the clips are assembled to resist disassembly of the clips. Thus, when the clips are assembled, the first and second engagement sections engage one another with the second engagement section overlying the slot of the first engagement section while the engaging member resists disassembly of the clips.

In yet further forms of the invention, a joint assembly is provided including first and second joint members and a clip assembly in accord with any one of the variations described above.

Accordingly, the present invention provides a fastener system including a clip assembly which resists and prevents rotation between the clip members when assembled as well as the corresponding joint members secured by the clip members, has improved strength over prior known fastening systems, yet provides a substantially hidden/concealed joint for improved aesthetic appearance of the joint or prevention of vandalism. The clip assembly provides ease of assembly while allowing larger tolerances in the joint members for proper operation without requiring expensive, precise machining prior to installation. A variety of clip forms are available for non locking, semi locking and fully locking installations. The clip assembly is compatible with existing boring machines and methods and can be easily manufactured from a single blank of material regardless of the variation desired.

These and other objects, advantages, purposes and features of the invention will become more apparent from a study of the following description taken in conjunction with the drawings.

BRIEF DESCRIPTION OF THE DRAWINGS

FIG. 1 is a perspective view of a joint structure during assembly of one joint member to a second joint member using a first, non-locking embodiment of the clip assembly of the present invention;

FIG. 2 is a sectional side elevation of the joint structure of FIG. 1 after assembly;

FIG. 2A is an end elevation of the joint structure of FIG. 2 taken along plane IIA—IIA of FIG. 2;

FIG. 39 is a perspective view of a joint structure during assembly of one joint member to a second joint member using a pair of non-locking embodiments of the clip assembly of the present invention in a completely closed pocket recess in one of the joint members; and FIG. 40 is a sectional side elevation of the joint structure of FIG. 39 during assembly.

DESCRIPTION OF THE PREFERRED EMBODIMENTS

Figure 2B:
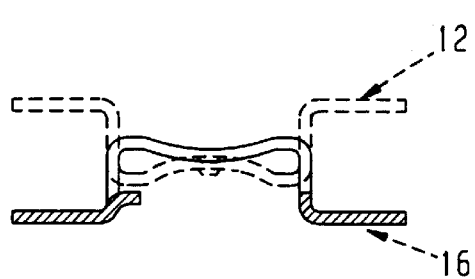
FIG. 2B is a schematic side elevation illustrating the unassembled positions of the clips of the present clip assembly invention.
Figure 7:
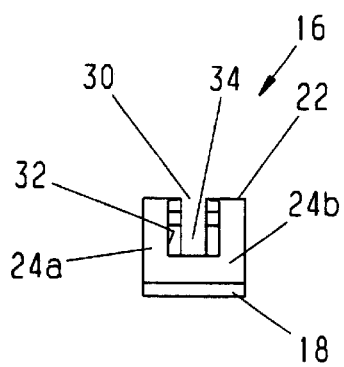
FIG. 7 is an end view of the clip FIG. 3.

FIGS. 1, 2 and 2A illustrate a typical joint structure 1 in which the present clip assembly invention 10 is useful, such as a furniture assembly, in this case, a leg or support 4 of a table, chair or the like to which a cross rail or horizontal support 6 is attached via the present invention. Vertical support or leg 4 includes a side edge 5 to which is secured one of the two portions of clip assembly 10, in this case, male clip 12, via mounting screws 14. Horizontal support or rail 6 includes an end edge 7 in which a pocket or recess 8 is formed having a bottom surface to which the second portion of clip assembly 10 in this case slotted, female clip 16 is secured again by a pair of mounting screws 14. Pocket 8 has a window or opening 9 extending through adjacent or bottom surface 11 of rail 6 such that, as explained more fully below, when rail 6 is moved downwardly, clips 12 and 16 engage one another through opening 9 and within recess 8, are telescoped together and interengage one another, thereby drawing the two joint members 4, 6 tightly together to form a secure joint. When assembled, clip assembly 10 is substantially hidden or concealed within pocket 8 such that the clip assembly cannot be viewed from the exterior except through window or opening 9. Clip assembly 10 thus forms a secure joint assembly which is substantially concealed for aesthetic purposes, discouragement of vandalism, or the like. Alternately, as will be explained below, clip 12 may be mounted in pocket 8 with its narrower leg 58 facing opening 9, while clip 16 is mounted on surface 5. In either case, the clips are telescoped together for assembly.

Figure 3:
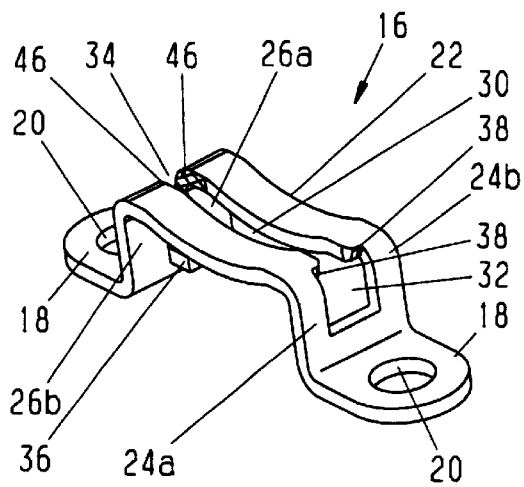
FIG. 3 is a front perspective view of a first embodiment of the slotted female clip of the present invention comprising a non-locking version.
Figure 5:
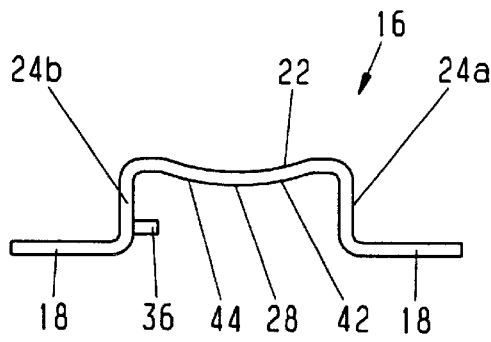
FIG. 5 is a side elevation of the clip of FIG. 3.
Figure 4:
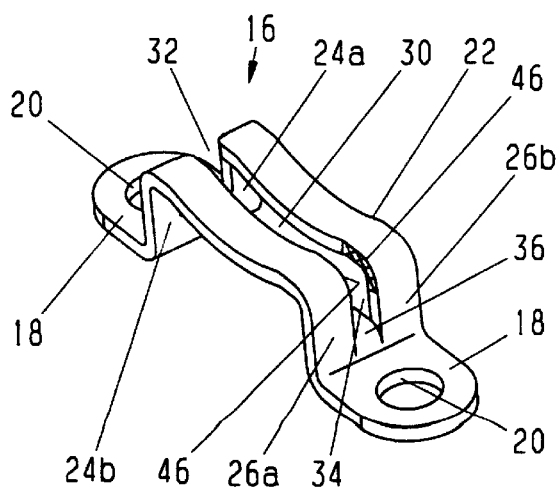
FIG. 4 is a rear perspective view of the female clip of FIG. 3.
Figure 6:
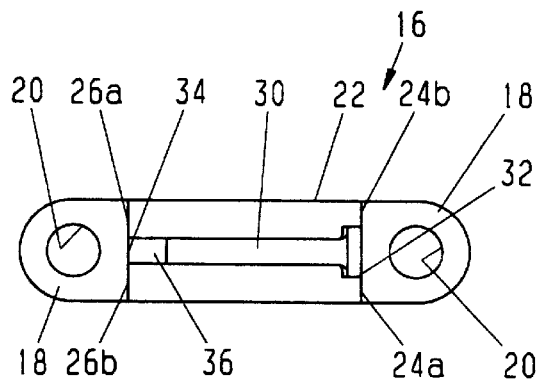
FIG. 6 is a plan view of the clip of FIG. 3.

As is best seen in FIGS. 3–7, slotted, female clip 16 includes a pair of generally coplanar mounting portions or flanges 18 each of which includes a mounting hole or aperture 20 through which mounting screws 14 are received when the clip is attached to a joint member. Clip 16 includes a generally raised central section including an engagement portion or section 22 which is connected to mounting flanges 18 by means of upstanding support members or legs 24a, 24b and 26a, 26b. Legs 24a, 24b and 26a, 26b preferably extend at a generally right angle to the plane of mounting flanges 18 and connect to opposite ends of central engagement section 22. Section 22 is elongated, has a length generally longer than its width as shown in the drawings, and extends generally at a right angle to support legs 24, 26 (FIG. 5). However, as shown in FIGS. 3–5, engagement section 22 is arcuate and curves downwardly toward the plane of flanges 18 and toward an area generally equidistant from legs 24 and 26 forming an apex 28 generally midway therebetween. In addition, engagement section 22 includes slot 30 which is generally parallel to the longitudinal extent of engagement section 22, has opposing slot edges which extend generally parallel to one another, and extends from one end of the engagement section to the other at a location generally midway between the side edges of the engagement section. At either end of slot 30 is a space communicating with the slot, each space being located generally between the upstanding support legs. At the front or entrance end of clip 16 is a space 32 which is approximately twice as wide as the width of slot 30 (FIG. 3), while at the rear or terminal end of clip 16 is space 34 which has substantially the same width as slot 30 (FIG. 4). An orienting tab 36 useful for orienting the clip in vibratory feeding systems for automated installation is bent out of the material from which slot 34 is formed and extends generally at a right angle to support legs 26a, 26b. At the transition from wider slot portion 32 to slot 30 at the upper end of support legs 24a, 24b are shoulders 38 which limit the movement of male clip 12 when telescopically assembled to clip 16 into the final assembled position as will be explained more fully below. As shown in FIG. 5, due to its curvature toward apex 28, central engagement section 22 includes inclined surfaces 42, 44 on either side of apex 28, which surfaces facilitate assembly with clip 12 as will be explained more fully below.

Preferably, female clip 16 is formed in one piece from a single blank of flexible, resilient spring steel by stamping and bending as will be more fully explained below. A suitable spring steel is that obtained under SAE No. 1050. Alternately, other materials such as flexible, resilient plastic such as polycarbonate, Delrin or ABS could be molded into the shape of clip 16. In either case, central engagement section 22 is resilient, flexible and has sufficient memory to return to its original unassembled position as shown in FIG. 2b when disassembled from male clip 12 as explained below.

In order to enhance the tightness of the resulting joint when assembled with clip 12 and to prevent skewing or rotation between the clips when assembled, the areas of clip 16 in the transition between slot 30 and space 34 at the corners 46 between support legs 26a, 26b and central engaging section 22 are slightly built up such that the slot at such location is slightly narrower for tighter engagement with the corresponding portion of clip 12 as will be more fully explained below. Those narrowed corner areas 46 are referred to as wedge areas for enhancement of the resulting joint.

Figure 8:
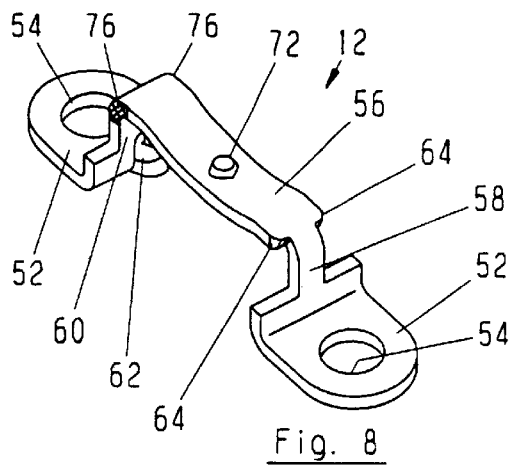
FIG. 8 is a front perspective view of a first embodiment of the male clip of the present invention.
Figure 9:
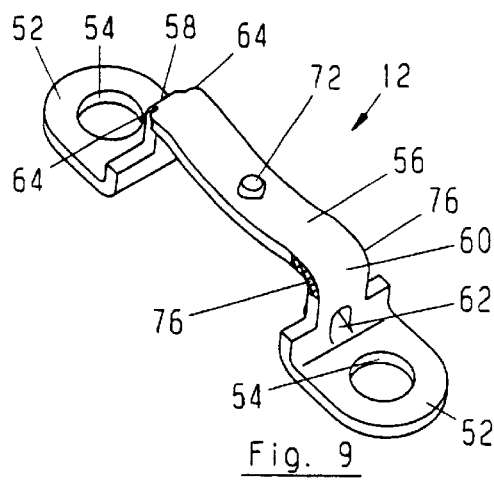
FIG. 9 is a rear perspective view of the male clip of FIG. 8.
Figure 10:
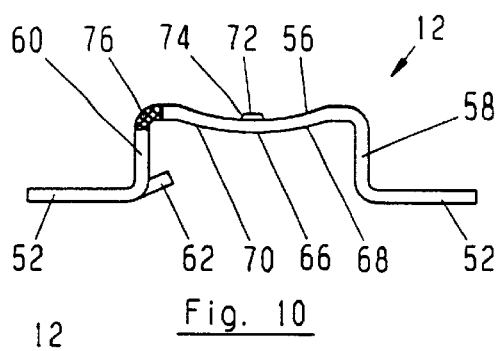
FIG. 10 is a side elevation of the clip of FIG. 8.
Figure 12:
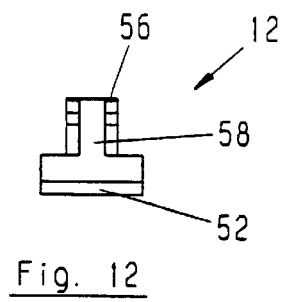
FIG. 12 is an end view of the clip of FIG. 8.
Figure 11:
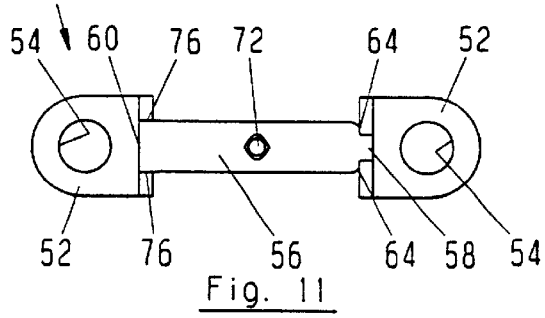
FIG. 11 is a plan view of the clip of FIG. 8.
Figure 13:
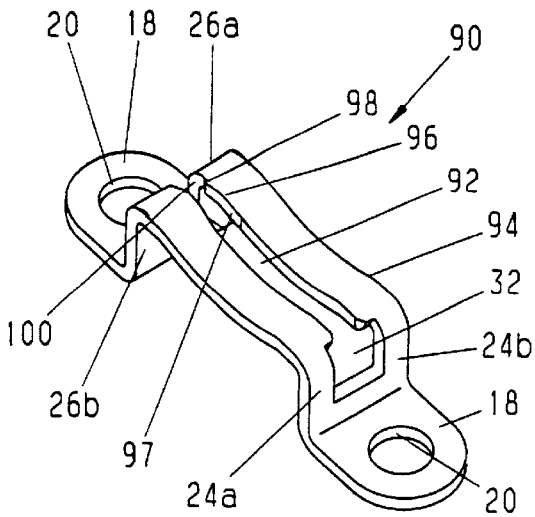
FIG. 13 is a front perspective view of a second embodiment of the slotted female clip of the present invention incorporating a semi locking feature.
Figure 14:
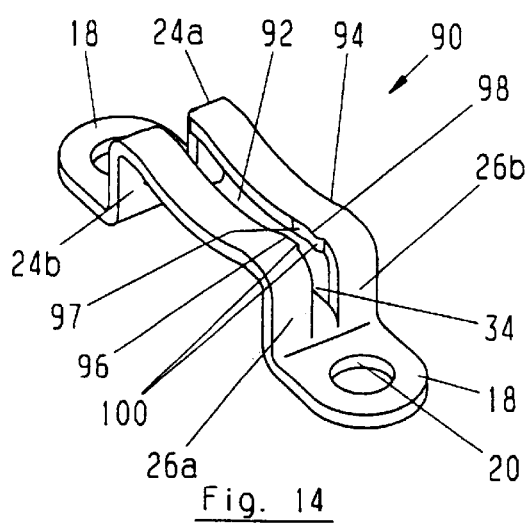
FIG. 14 is a rear perspective view of the female clip of FIG. 13.
Figure 15:
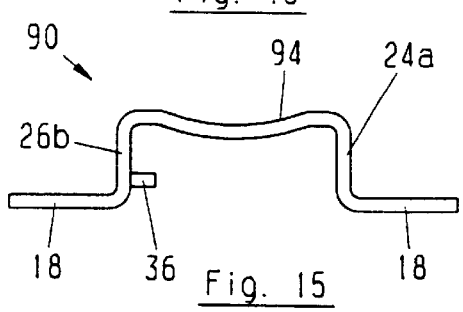
FIG. 15 is a side elevation of the clip of FIG. 13.
Figure 16:
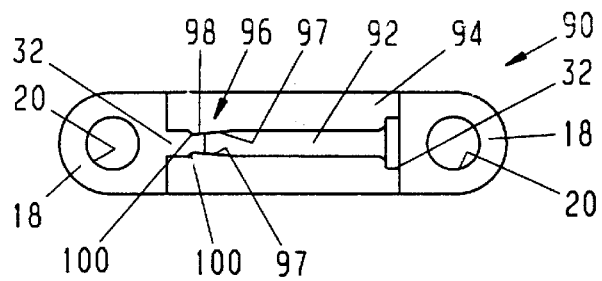
FIG. 16 is a plan view of the clip of FIG. 13.
Figure 17:
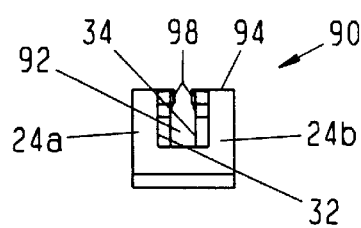
FIG. 17 is an end view of the clip of FIG. 13.
Figure 18:
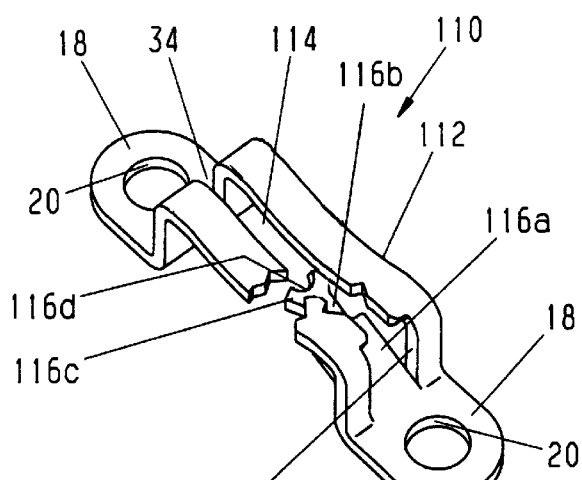
FIG. 18 is a front perspective view of a third embodiment of the slotted female clip of the present invention incorporating a locking feature and having portions broken away.
Figure 19:
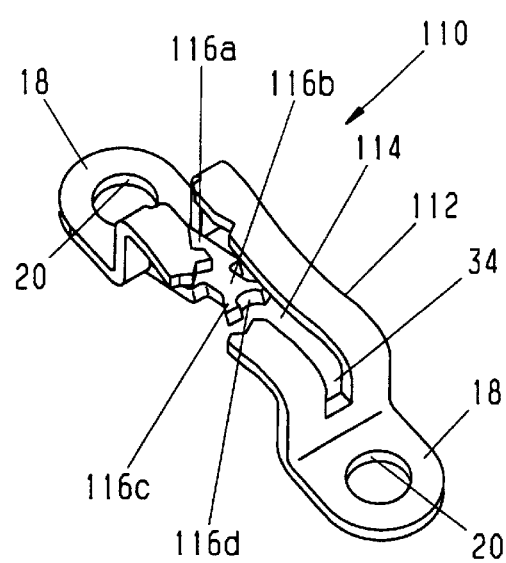
FIG. 19 is a rear perspective view of the clip of FIG. 18 with portions broken away.

As is best seen in FIGS. 8–12, the other portion of clip assembly 10 is male clip 12 which includes a pair of generally coplanar mounting portions or flanges 52, each of which includes a circular aperture 54 for receiving a mounting screw 14 as mentioned above. Clip 12 includes a generally raised central engagement section 56 which is elongated and has a length greater than its width. In addition, the width of engagement section 56 is wider than the width of slot 30 in the area of engagement section 22 but slightly narrower than the width of space 32 intermediate support legs 24a, 24b. Engagement section 56 is joined to mounting flanges 52 by means of a pair of upstanding connecting legs 58, 60, one at either end of the engagement section. Leg 58 has a width narrower than the width of engagement section 56 and slightly narrower than the width of slot 30 of clip 16 such that leg 58 may be inserted through slot 30 as will be more fully explained below. The width of leg 60 is substantially similar to that of engagement section 56. An orienting tab 62 useful with vibratory feed systems for automated installation of clip 12 during manufacture may be bent out of leg 60 as is best seen in FIGS. 8–10. At the transition between narrower leg 58 and engagement section 56, is a pair of spaced shoulders 64, one on either side of leg 58. Shoulders 64 limit the insertion of clip 12 in clip 16 at the final assembled position as will be more fully explained below.

Like central engagement section 22 of clip 16, engagement section 56 of clip 12 is arcuate and curved toward the plane of mounting flanges 52 to a lowermost point or apex 66 at the midpoint between legs 58 and 60 such that section 56 includes inclined, ramp areas 68, 70 on either side of apex 66 (FIG. 10). At the midpoint of engagement section 56 opposite apex 66 is an outwardly extending protrusion or dimple which is preferably coined in section 56 during manufacture. Protrusion 72 has sloped sides 74 best seen in FIG. 10 which are adapted to engage a locking flange on the locking version 110 of the female, slotted clip as will be explained more fully below.

Preferably, clip 12, like clip 16, is formed in one piece from a resilient material such as spring steel, an example of which is SAE No. 1050 which has been found suitable. Alternately, clip 12 could be molded or otherwise formed from a flexible, resilient, plastic material such as polycarbonate, Delrin or ABS. In either case, engagement section 56 is resilient and flexible and has sufficient memory to return to its curved, arcuate shape following disassembly as shown in FIG. 2B.

Just as in clip 16, a portion of clip 12 may be widened to form wedge areas which help provide a tight, secure joint and prevent rotation between clips 12 and 16 when assembled. In clip 12, the corner edge areas 76 of the clip at the transition between support leg 60 and engagement section 56 are slightly widened for tight engagement with the edges of space 32 as will be more fully explained below.

With further reference to FIGS. 1, 2, 2A and 2B, the assembly of clips 12 and 16 to form a tight, secure joint will now be understood. Following the mounting of clip 16 in pocket recess 8 via mounting screws 14 received through apertures 20 of mounting flanges 18, male clip 12 is mounted on an exposed surface 5 of joint member 4 generally parallel to edge 5 such that rail 6 will be generally parallel to leg 4 when assembled. It will be understood that the positions of clips 12 and 16 maybe reversed within the scope of this invention such that clip 12 is secured in pocket recess 8 and clip 16 is secured to surface 5. Rail 6 including clip 16 is then moved toward clip 12 such that narrower leg 58 is received at the entrance to slot 30 in engagement section 22 adjacent shoulders 38 and wider space 32 between support legs 24a, 24b. Continued movement of the clips toward one another causes inclined, ramp area 68 to engage inclined, ramp area 42 of the opposing engagement section. Further movement of the clips toward the position shown in FIG. 2 causes flexure of the resilient engagement sections away from their respective mounting flanges until the final assembly position is reached as shown in FIGS. 2 and 2A. In this position, shoulders 38 on clip 16 engage the inside surface of support leg 60 while shoulders 64 on clip 12 engage the inside surfaces of support legs 26a, 26b, thereby positioning the clips in opposition to one another with apexes 28, 66 in engagement, leg 60 received in space 32, and narrower leg 58 received in space 34. In this position, mounting portions 18, 52 are aligned and in opposition to one another on opposite sides of pocket recess 8 as shown in FIG. 2. The flexible resilient inclined areas of engagement sections 22, 56 facilitate the sliding, telescoping assembly of the two clips within one another as described above with the engagement sections flexing from their unstressed positions as shown in FIG. 2B to the flexed, final position shown in FIG. 2. The resiliency of the material of clips 12, 16, coupled with the secure attachment of the clips to the opposite joint members 4, 6, draws and urges the joint members tightly together to form a secure joint with engagement section 56 overlapped with and overlying slot 30 in engagement section 22. Since the load on the engagement sections is distributed over both mounting portions at either end thereof on each clip, the resulting joint is strong in tension, torsion and shear. However, the joint itself is substantially hidden and concealed within pocket recess 8 so that clip assembly 10 is not visible from the exterior of the joint except through the small window opening 9 at one end of the clip assembly. In the final assembled positions, wedge areas 46 on clip 16 engage the edges of narrower leg 58 adjacent shoulders 64 while widened wedge areas 76 of clip 12 engage the edges of space 32 adjacent shoulders 38 to tighten the engagement between the clips and further prevent rotation between the interengaged clips thereby creating a tighter, more secure joint.

When disassembly is desired, rail 6 is impacted against surface 11 to force the clips 12, 16 apart, the impact force which is needed being only that which will overcome the friction force of rail 6 against leg 4 and the drawing force of engagement between the resilient engagement sections 22, 56. Once slightly moved away from the final assembled position, the inclined, ramp areas 42, 68 and the resiliency of the clip material help movement of the clips away from one another while the resilient clip material springs back to its original position ready for reassembly.

As will be understood from FIGS. 1, 2 and 2A, the preferred width of pocket recess 8 formed in surface 7 of joint member or rail 6 is only slightly wider than the width of clip 16. Preferably, the width of the pocket recess 8 is greater than that of the clip mounted therein by a dimension within the range of between about 3% and about 5% of the width of the clip. Such width helps guide clip 12 when entering pocket 8 into proper engagement with clip 16 through space 32 and into slot 30. In addition, as will be understood from FIG. 2, each of clips 12, 16 has a height dimension which is less than the depth of pocket recess 8. Because of the resiliency and flexibility of engagement sections 22, 56, the precise tolerance of the depth of pocket recess 8, and thus the position at which clips 12 and 16 engage one another, need not be extremely precise. It has been found that the depth of recess 8 can be within a range of between about 50% and about 63% greater than the overall height dimension of either clip 12 or 16 without affecting the overall function of the clip assembly and the resulting joint. Clips 12 and 16 preferably have the same height dimension.

Figure 37:
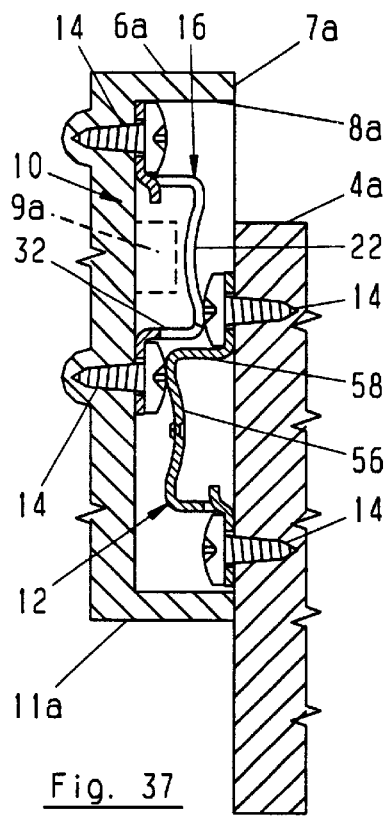
FIG. 37 is a sectional side elevation of the joint of FIG. 36 during assembly.
Figure 36:
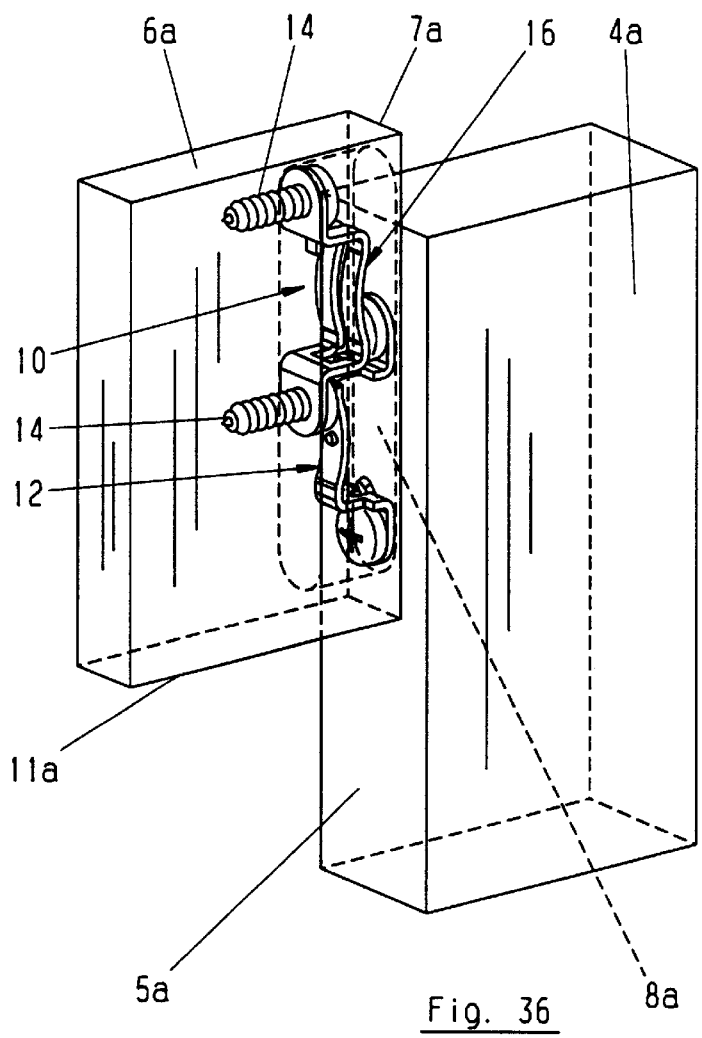
FIG. 36 is a perspective view a joint structure during assembly of one joint member to a second joint member using a non-locking embodiment of the clip assembly in a closed pocket recess formed in one of the joint members.
Figure 38:
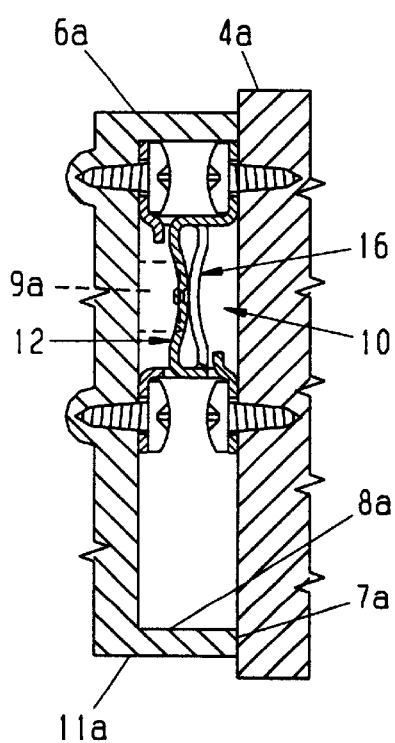
FIG. 38 is a sectional side elevation of the joint of FIG. 36 when fully assembled.

With reference to FIGS. 36–40, the use of one or more clip assemblies in alternate forms of the pocket or recess 8 will be understood. As shown in FIGS. 36–38, a vertical support or leg 4a including a side edge 5a is adapted to abut against an edge 7a of a horizontal support, rail or furniture member 6a in which a pocket or recess 8a is formed. Pocket 8a is formed to include a bottom surface to which female clip 16 is secured by a pair of mounting screws 14. Pocket 8a has a depth substantially similar to pocket 8 but is closed at both ends. In addition, pocket 8a is substantially longer than pocket 8 such that it can receive therein the overlapping lengths of the disassembled clips of clip assembly 10 as shown in FIG. 37. When used, male clip 12 is secured via mounting screws 14 to an exposed surface of side edge 5a. Clip 12 is generally parallel to edge 5a such that member 6a will be generally parallel to leg 4a when assembled. As in the previous assembly of FIGS. 1, 2, 2A and 2B, it will be understood that the positions of clips 12 and 16 may be reversed within the scope of the invention such that clip 12 is secured in pocket recess 8a and clip 16 is secured to surface 5a. Member 6a is then moved toward leg 4a such that the engagement section 22 of clip 16 is positioned adjacent but offset from the engagement section 56 of clip 12. In this position, leg 58 of clip 12 is positioned adjacent space 32 of clip 16 and in alignment with slot 30. Member 6a including clip 16 is then moved toward clip 12 such that narrower leg 58 is received at the entrance to slot 30 in engagement section 22 adjacent shoulders 38 and wider space 32 between support legs 24a, 24b. Continued movement of the clips toward one another causes engagement between the inclined, ramp areas of the opposing engagement sections. Further movement of member 6a brings the clips 12, 16 into alignment with one another in the fully engaged position shown in FIG. 38 such that the flexible, resilient inclined areas of the engagement sections 22, 26 draw and urge joint members 4a, 6a tightly together to form a secure joint in the manner described above for joint 1. It will, thus, be understood that closed pocket 8a completely hides the clip assembly 10 following assembly. Clip 12 is inserted into position for assembly with clip 16 through the open side of slot 8a in edge 7a of member 6a without the necessity for inclusion of a window or opening 9 through the adjacent or bottom surface of member 6a. When disassembly is desired, member 6a is impacted against surface 11a to force the clips 12, 16 apart as described above for joint 1.

A further modification of the joint using a pair of clip assemblies 10 of the present invention is shown in FIGS. 39 and 40. In this version, vertical support or leg 4b includes a side edge 5b to which are secured two of the male clips 12 so as to form portions of a pair of clip assemblies 10. Horizontal support, rail or member 6b includes an end edge 7b in which a pocket or recess 8b is formed having a bottom surface to which the second portions of clip assemblies 10, namely, female clips 16 are also secured also by a pair of mounting screws 14. Pocket 8b is substantially longer than either pockets 8 or 8a such that clips 16 may be secured at spaced positions therein. Likewise, clips 12 on side edge 5b are secured at spaced positions, the spacing between clips 12 and 16 being the same in their respective locations.

Assembly of the pair of clip assemblies 10 is made substantially as described above in connection with FIGS. 36–38 by moving member 6b toward leg 4b such that the engagement sections of the respective clips are adjacent and aligned with one another, clips 12 being received in pocket 8b through the opening to the pocket in end edge 7b of member 6b. Member 6b is then moved downwardly to engage the clips of the respective pair of clip assemblies simultaneously, each clip assembly telescoping together in the manner described above in connection with the prior joints until each clip assembly is in its final assembled position similar to that shown in FIG. 38. As with the closed pocket joint of FIGS. 36–38, when assembled, the pair of clip assemblies in the joint of FIGS. 39 and 40 is hidden or concealed within pocket 8b such that neither clip assembly can be viewed from the exterior. When disassembly is desired, member 6b is impacted against surface 11b to force the clips in each clip assembly apart, after which the members 6b and 4b may be moved away from one another.

Alternate forms of the slotted, female clip will now be described and include structure for partially or completely resisting disassembly unless additional disassembly steps are taken. As shown in FIGS. 13–17, a semi locking version 90 of the slotted, female clip is illustrated. Clip 90, in which like parts have like numbers to those in FIGS. 3–7, is substantially similar to clip 16 except for a modified slot 92 in central engagement section 94. Slot 92 has the same width as slot 30 and includes a tapered slot section 96 in which the edges of slot 92 inwardly toward one another in a direction from the entry area of the slot adjacent space 32 toward the slot space 34. The tapered slot edges culminate in a narrowed throat 98 having a width less than the width of slot 92 and less than the width of narrowed leg 58 of male clip 12. Continuing toward space 34, the edges of slot 92 taper outwardly after throat 98 but in a shorter distance than the tapered section leading to throat 98 until the end of the slot at space 34 is the same width as that at the entrance. Accordingly, when semi locking, slotted female clip 90 is assembled with male clip 12 into the position shown in FIG. 2, narrower leg 58 of clip 12 slides along slot 92 during assembly until it reaches tapered slot portion 96. Further movement of leg 58 along slot 92 forces and cams the opposing portions of the resilient, flexible engagement section 94 adjacent slot 92 apart as the leg engages the inwardly tapering sides of the slot approaching throat 98. After leg 58 passes throat 98, the opposing portions of engagement section 94 snap back to their original position as leg 58 enters space 34 in the final assembly position. Disassembly of clip 12 from clip 90 is resisted by the engagement of leg 58 with tapered slot areas 100 on the rear side of throat 98. Depending on the angle of those tapered edges 100, the resistance to disassembly is greater or lesser. For example, if edges 100 extend at a 45° angle to the parallel edges of slot 92, a significant force would be required to cause leg 58 to move and cam the opposing portions of engagement section 94 apart allowing removal of leg 98 and thus clip 12 from clip 90 along slot 92. However, when tapered slot edges 100 extend at a 90° angle to the parallel edges of slot 92, leg 58 is prevented from passing through throat area 98 and the two clips are permanently locked together. Preferably, edges 100 extend at an angle of about 5° to about 90°, and more preferably an angle of about 20° to about 60° to the edges of slot 92. Accordingly, the camming angle of slot edges 100 determines the degree of resistance to disassembly of the clips from one another when clip 90 is used with clip 12.

Figure 20:
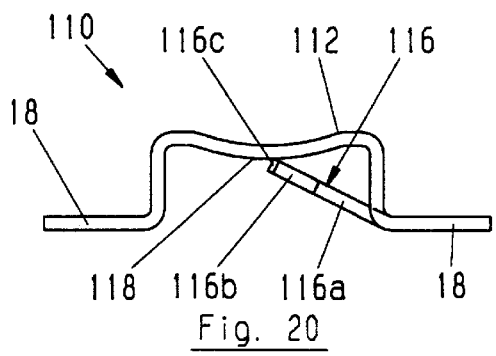
FIG. 20 is a side elevation of the clip of FIG. 18.
Figure 22:
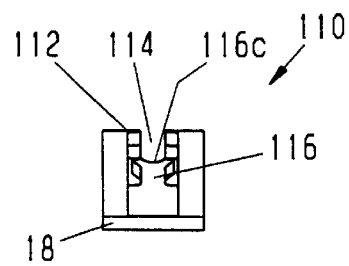
FIG. 22 is an end elevation of the clip of FIG. 18.
Figure 21:
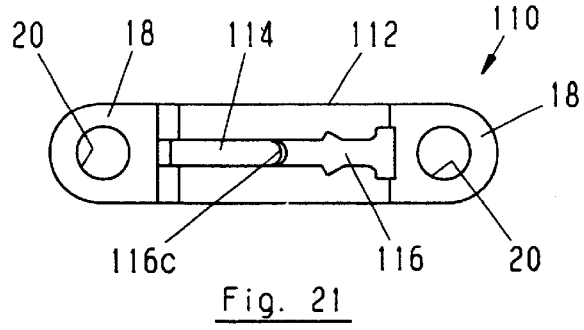
FIG. 21 is a plan view of the clip of FIG. 18.

A locking version of the slotted, female clip is shown at 110 in FIGS. 18–22. In this version, where like numerals indicate like parts to those in clip 16, central engagement section 112 includes slot 114 having the same width as slot 30 and extending from a wider slot portion 32 at the front or entrance end of the clip to slot portion 34 at the rear or terminal end of the clip. In addition, clip 110 includes a locking member or flange 116 which extends inwardly and upwardly from mounting flange 18 adjacent the entry of engagement section 112 toward slot 114 at the middle or apex 118 of engagement section 112 as is best seen in FIG. 20. Locking flange 116 is generally planar and rectilinear and includes a first section 116a having the width of wider slot portion 32 and a narrower extending portion 116b having the width of slot 114. Locking flange 116 terminates in a Y-shaped free end 116c having a curved recess 116d adapted to mate with and receive the edge of projection 72 from clip 12 when the clips are fully assembled.

Figure 23:
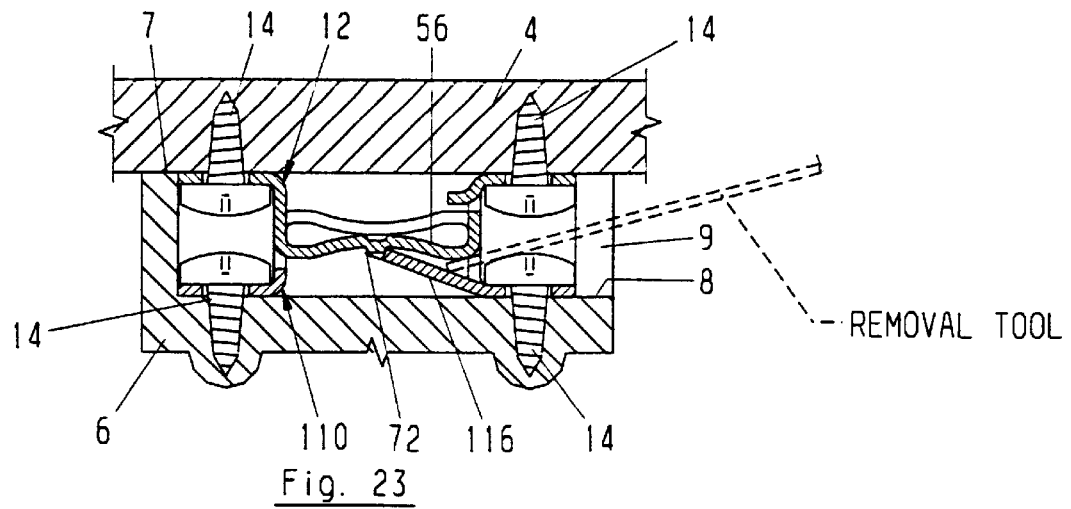
FIG. 23 is a sectional side elevation showing the assembly of the female clip of FIGS. 18–22 with the male clip of FIGS. 8–12.

The assembly of clip 110 with clip 12 is shown in FIG. 23. As clip 12 is telescoped together with clip 110 such that narrower leg 58 passes through wider slot portion 32 and into slot 114, the transition area between leg 58 and engagement section 56 engages the top surface of locking flange 116 and bends it slightly downwardly. As leg 58 continues to pass through slot 14 to the final assembled position of the two clips, the resiliency of flange 116 urges it toward clip 12 until protrusion 72 passes over flange 116 and is received in recess 116c as shown in FIG. 23. Any attempt to slide the clips in the opposite direction and remove clip 12 from clip 110 causes flange 116 to more tightly engage protrusion 72 thereby resisting disassembly of the clips and the joint created thereby such that the clip assembly is locked in its assembled position. However, if disassembly is desired, a tool such as a long, thin blade or shaft may be inserted through opening 9 to pocket recess 8 intermediate securing screws 14 in the space between locking flange 116 and engagement section 56 (FIG. 23) to force flange 116 downwardly thereby releasing protrusion 72 from recess 116d and allowing the clips to be slid apart in the same manner as described above for clip assembly 10. In the event that disassembly of clip 110 from clip 12 is desired when a closed pocket recess such as 8a or 8b is used as described above, a small side window of the type shown at 9a or 9b in FIGS. 38, 40 may be included in the side wall of pocket 8a or 8b. A screwdriver or other elongated tool may be inserted into the otherwise closed pocket through the side window to force flange 116 downwardly to release the clips. The clip assembly remains substantially concealed except for a small portion visible through window 9a or 9b.

Figure 24:
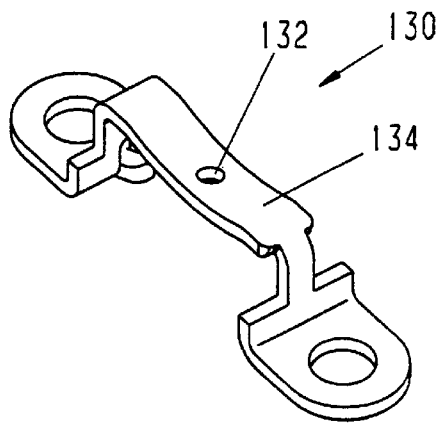
FIG. 24 is a front perspective view of a second embodiment of the male clip of the present invention.
Figure 25:
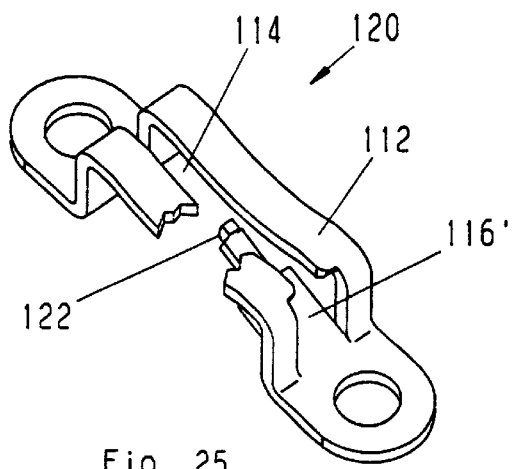
FIG. 25 is a front perspective view of a fourth embodiment of the slotted female clip of the present invention.
Figure 26:
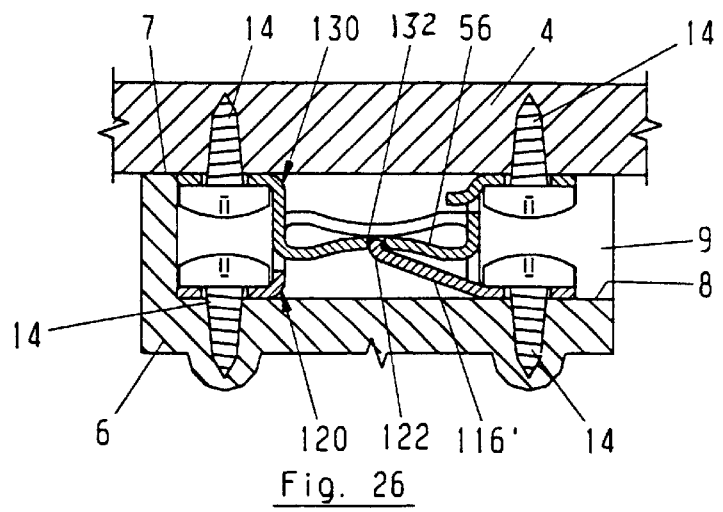
FIG. 26 is a sectional side elevation of a joint incorporating the assembled clips of FIGS. 24 and 25.

As shown in FIGS. 24–26, a modified version 120 of the locking clip, wherein like parts are indicated by like numerals to those in clips 16, 90 and 110, is similar to clip 110 except for the terminal end of modified locking flange 116'. Instead of a Y-shaped, recessed free end edge on the locking flange, modified flange 116' includes a cleat, lug or projection 122 which extends outwardly from the free end of flange 116' toward slot 114 at the midpoint or apex of the engagement section 112 as is best seen FIGS. 25 and 26. Lug 122 is adapted to be received in an aperture 132 of modified male clip 130 which is similar to clip 12 except for the replacement of protrusion 72 with circular aperture or hole 132 at the apex or midpoint of modified engagement section 134. When clips 120 and 130 are telescopingly assembled in the manner described above for clips 110, 116 in FIG. 23, locking flange 116' is urged downwardly during assembly and snaps back such that lug or cleat 122 enters aperture 132 to lock the clips in final assembled position as shown in FIG. 26 thereby preventing disassembly of the clips and the accompanying joint until a removal tool is inserted through pocket window 9 to bend flange 116 downwardly and allow release of the clips.

Figure 27:
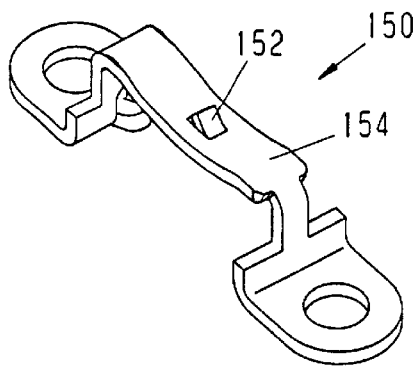
FIG. 27 is a front perspective view of a third embodiment of the male clip of the present invention.
Figure 28:
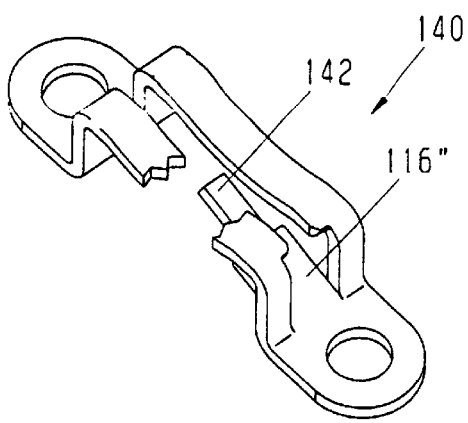
FIG. 28 is a front perspective view of a fifth embodiment of the slotted female clip of the present invention with portions broken away.
Figure 29:
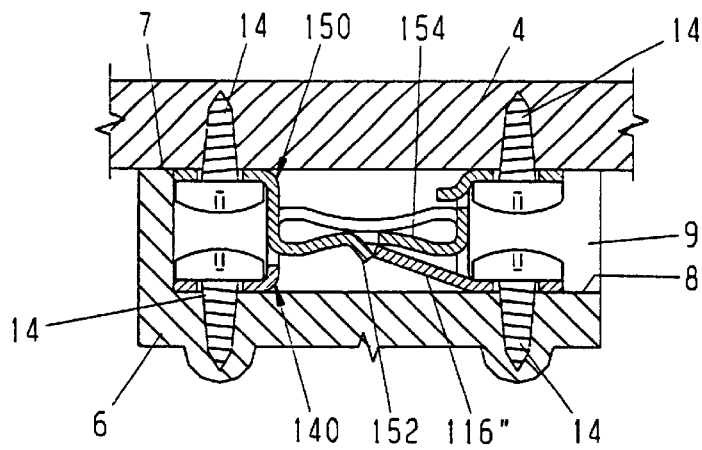
FIG. 29 is a sectional side elevation of a joint incorporating the assembly of the clips of FIGS. 27 and 28.

As shown in FIGS. 27–29, a further modified locking clip assembly is shown including a modified slotted female clip 140 similar to clips 110 and 120 except that modified locking flange 116" includes a flat terminal or free end edge 142. Clip 140 is adapted for assembly with a modified male clip 150 similar to clips 12 and 130 except for the substitution of a bent flange 152 extending outwardly from the middle or apex of engagement section 154. When clip 140 is assembled with modified clip 150 into the final assembled position shown in FIG. 29, locking flange 116" is bent resiliently downwardly to pass over the engagement section 154 of clip 150 and over tab 152 until it snaps into position behind tab 152 thereby locking the clips together and preventing disassembly until a removal tool of the type described above is inserted through pocket window 9, 9a or 9b to bend locking flange 116" downwardly allowing release.

Figure 30:
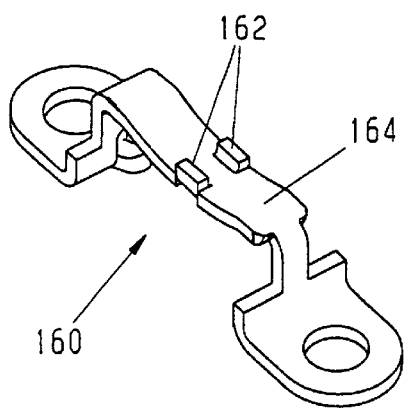
FIG. 30 is a front perspective view of a fourth embodiment of the male clip of the present invention.
Figure 31:
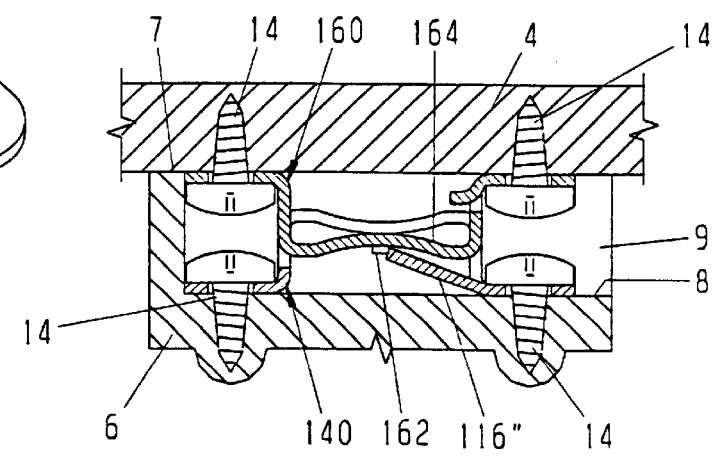
FIG. 31 is a sectional side elevation of a joint incorporating an assembly of the clips of FIGS. 30 and 28.

Yet another version of the locking assembly is shown in FIGS. 30 and 31 in which locking clip 140 as described above is combined with a modified male clip 160 similar to clips 12, 130 and 150 except for the substitution of a pair of spaced lugs or protrusions 162 at opposite side edges of engagement section 164. Lugs 162 extend outwardly from the engagement section generally opposite the midpoint or apex of section 164 and are engaged by the free end 142 of clip 140 simultaneously when clips 140 and 160 are telescoped into their final assembled position as shown in FIG. 31. Locking flange 116" thus prevents disassembly until it is bent downwardly by a removal tool passed through window opening 9, 9a or 9b to urge flange 116" below lugs 162 thereby allowing release.

Figure 32:
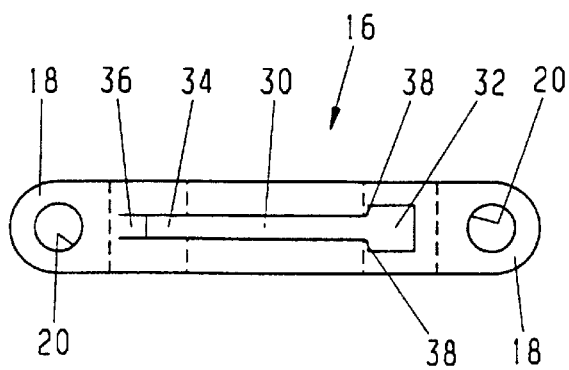
FIG. 32 is a plan view of a blank of metal for forming the first embodiment of the slotted female clip of FIGS. 3–7 after stamping but prior to bending.

When spring steel is used, the metal blanks from which clips 12, 16, 90 and 110 are formed are shown in FIGS. 32–35 following stamping but prior to bending. In FIG. 32, clip 16 is stamped to form the exterior peripheral configuration, the circular areas forming mounting holes 20, and the space forming slot 30 with slot portions 32 and 34. One end of the slot area is retained to form bent tab 36. The blank is then bent to form the upstanding support legs, central engagement section and mounting flanges, all as described above, along the dotted lines as shown.

Figure 33:
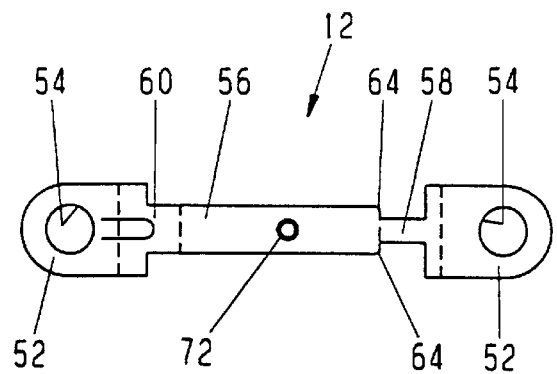
FIG. 33 is a plan view of a metal blank for forming the first embodiment of the male clip of FIGS. 8–12 shown after stamping but prior to bending.

Similarly, clip 12 is formed by stamping a blank from a sheet of spring steel as shown in FIG. 33 to form an exterior configuration including mounting flanges 52, support legs 58, 60, central engagement section 56 and coined protrusion 72 as well as orienting tab 62 by bending along the dotted lines as shown.

Figure 34:
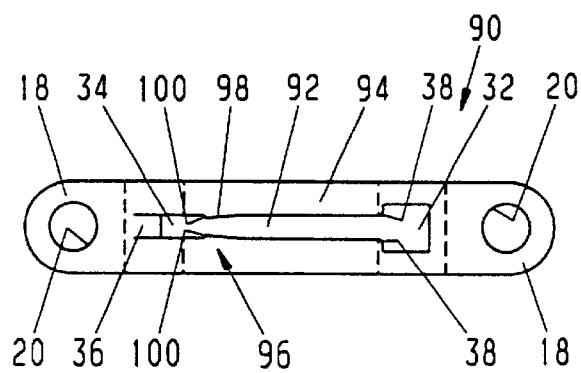
FIG. 34 is a plan view of a metal blank showing the second embodiment of the female slotted clip of FIGS. 13–17 shown after stamping but prior to bending.

In FIG. 34, the metal blank for semi locking clip 90 is stamped to include the exterior configuration while leaving spaces for slot 92 with slot sections 32 and 34, tapered slot section 96 with throat 98 and tapered edges 100 following by bending to the final configuration along the dotted lines as shown.

Figure 35:
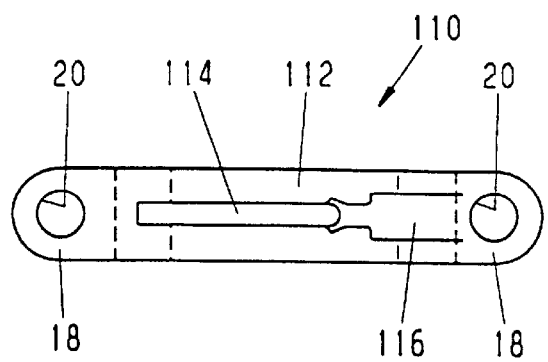
FIG. 35 is a plan view of a metal blank of the third embodiment of the female slotted clip of FIGS. 18–22 of the present invention shown after stamping but prior to bending.

Clip 110 is formed by stamping the metal blank shown in FIG. 35 to include an elongated space for slot 114 in engagement section 112 and rectilinear locking flange 116 extending inwardly toward slot 114 from the right hand mounting flange 18. The blank for clip 110 is then bent along the dotted lines while leaving flange 116 unbent but extending upwardly toward engagement section 112 from the mounting flange.

In a similar manner, clips 120, 130, 140, 150 and 160 may be stamped and bent from the single pieces of sheet spring steel. Alternately, as mentioned above, the clips may be molded from suitable, resilient, flexible plastic or other materials.

It will be understood that the above description and drawings are of the preferred embodiments and various changes or modifications can be made without departing from the spirit of the invention embodied therein, such as the use of different materials or a different method of attaching the clips to the joint members. Therefore, it will be understood that the embodiments shown in drawings and described above are not intended to limit the scope of the invention which is defined by the claims which follow.

What is claimed is:

1. A clip assembly for forming a joint structure to secure a first joint member to a second joint member, said clip assembly comprising:

a first clip having a pair of spaced first mounting portions for attachment to the first joint member, a first engagement section offset from and connected to said first mounting portions, and a slot extending along said engagement section, said slot having a first portion with a predetermined width;

a second clip adapted for attachment to the second joint member and for assembly with said first clip, said second clip having a pair of spaced second mounting portions, and a second engagement section offset from and connected to said second mounting portions, at least one portion of said second engagement section having a width greater than said first portion of said slot;

at least one of said first and second engagement sections having a resilient, flexible, inclined area;

whereby when said first clip is assembled to the first joint member, said second clip is assembled to the second joint member, and said second clip is assembled to said first clip with said second engagement section received through an area of said slot of said first engagement section, said first and second engagement sections contact and engage one another with said one portion of said second engagement section overlying said one portion of said slot of said first engagement section while said at least one resilient, flexible, inclined area urges the first and second joint members toward one another to form a tight, secure joint.

2. The clip assembly of claim 1 wherein each of said first and second engagement sections comprises a resilient, flexible, inclined area, whereby said inclined areas engage one another upon assembly of said clips.

3. The clip assembly of claim 2 wherein said inclined area of each of said first and second engagement sections is arcuate, curves toward the position of said respective mounting portions, and has an apex intermediate said respective mounting portions, said engagement sections engaging one another at said apexes upon assembly of said clips.

4. The clip assembly of claim 3 wherein each of said first and second engagement sections is formed from a material selected from the group consisting of spring steel and flexible, resilient plastic.

5. The clip assembly of claim 3 wherein each of said first and second clips is formed in one piece from a material selected from the group consisting of spring steel and flexible, resilient plastic.

6. The clip assembly of claim 1 wherein said clip on which said one engagement section is included is formed in one piece from a material selected from the group consisting of spring steel and flexible, resilient plastic.

7. The clip assembly of claim 6 wherein the other of said clips is also formed in one piece from material selected from the group consisting of spring steel and flexible, resilient plastic.

8. The clip assembly of claim 1 wherein said first and second engagement sections are generally coextensive with one another along their lengths when said clips are fully assembled.

9. The clip assembly of claim 8 wherein said first engagement section includes two ends, a first support member at one end joined to one of said first mounting portions, and a second support member at the other end joined to the other of said first mounting portions, said slot extending into said support members at each end of said first engagement section; said second engagement section including two ends, a third support member at one end joined to one of said second mounting portions, and a fourth support member at the other end joined to the other of said second mounting portions, said first and third support members engaging one another and said second and fourth support members engaging one another when said clips are fully assembled.

10. The clip assembly of claim 9 wherein said first and second support members each extend at a generally right angle to said first engagement section, and said third and fourth support members each extend at a generally right angle to said second engagement section, said first mounting portions being generally aligned with said second mounting portions when said clips are fully assembled.

11. The clip assembly of claim 10 wherein said first mounting portions are flanges which are generally co-planar with one another, said second mounting portions being flanges which are generally co-planar with one another.

12. The clip assembly of claim 1 wherein first clip further includes a locking member for engaging a receiving portion of said second clip and resisting disassembly when said clips are fully assembled.

13. The clip assembly of claim 12 wherein said locking member is a locking flange aligned with said first engagement section, said locking flange extending from a position spaced from said first engagement section toward said first engagement section.

14. The clip assembly of claim 13 wherein said receiving portion of said second clip includes a receiving area for engaging said locking flange when said clips are fully assembled; said locking flange having a free end engaging said receiving area.

15. The clip assembly of claim 14 wherein said receiving area is a raised protrusion extending outwardly from said second engagement section.

16. The clip assembly of claim 15 wherein said locking flange includes a recess in said free end, said recess receiving said raised protrusion therein.

17. The clip assembly of claim 14 wherein said receiving area includes a plurality of spaced protrusions on said second engagement section.

18. The clip assembly of claim 14 wherein said receiving area includes an aperture in said second engagement section; said locking flange including an extending member received in said aperture.

19. The clip assembly of claim 1 including a protrusion for use in orienting said clip with a vibrator hopper feeding system.

20. A clip assembly for forming a joint structure to secure a first joint member to a second joint member, said clip assembly comprising:

a first clip having a pair of spaced first mounting portions for attachment to the first joint member, a first engagement section offset from and connected to said first mounting portions, and a slot extending along said engagement section, said slot having a first portion with a predetermined width;

a second clip adapted for attachment to the second joint member and for assembly with said first clip, said second clip having a pair of spaced second mounting portions, and a second engagement section offset from and connected to said second mounting portions, at least one portion of said second engagement section having a width greater than said first portion of said slot;

each of said first and second engagement sections having a resilient, flexible, inclined area;

whereby when said first clip is assembled to the first joint member, said second clip is assembled to the second joint member, and said second clip is assembled to said first clip through said slot of said first engagement section, said inclined areas of said first and second engagement sections engage one another with said one portion of said second engagement section overlying said slot of said first engagement section while said resilient, flexible, inclined areas urge the first and second joint members toward one another to form a tight, secure joint;

said inclined area of each of said first and second engagement sections being arcuate and curving toward the position of said respective mounting portions, and having an apex intermediate said respective mounting portions, said engagement sections engaging one another at said apexes upon assembly of said clips;

said first mounting portions including first mounting flanges, said first engagement section having first and second ends, one of said first mounting flanges being connected to said first end of said first engagement section by a first pair of spaced, upstanding legs having a first space therebetween, the other of said first mounting flanges being connected to said second end of said first engagement section by a second pair of spaced, upstanding legs having a second space therebetween, said slot extending from said engagement section into said first and second spaces between said spaced legs; said second mounting portions of said second clip including second mounting flanges, said second engagement section having first and second ends, one of said second mounting flanges connected to said first end of said second engagement section by an upstanding leg, the second of said second mounting flanges being connected to said second end of said second engagement section by an upstanding leg, whereby upon assembly, one of said upstanding legs of said second clip is passed through said slot to a fully assembled position in which said upstanding legs of said second clip are received respectively in said first and second spaces between said spaced, upstanding legs of said first clip while said first and second engagement sections engage one another.

21. The clip assembly of claim 20 wherein said slot includes a second portion which is wider than and communicates with said first portion of said slot; said second clip being assembled to said first clip by telescoping movement of said second engagement section into engagement with said first engagement section by passing said second engagement section through said second slot portion, said one leg of said second clip passing through said first slot portion while said first and second engagement sections move along one another.

22. The clip assembly of claim 21 wherein said one leg of said second clip is a narrower leg and has a width narrower than said one portion of said second engagement area, said narrower leg received through said first portion of said slot when said engagement sections are assembled together with said telescoping movement.

23. The clip assembly of claim 22 wherein said second, wider portion of said slot is located in said first space between said first pair of upstanding legs of said first clip such that said upstanding leg connected to said second mounting flange of said second clip is received in said second portion of said slot and said narrower leg is received in said second space between said second pair of said upstanding legs of said first clip when said engagement sections are assembled together with said telescoping movement.

24. The clip assembly of claim 23 wherein at least one of said upstanding leg connected to said second mounting flange of said second clip and said narrower leg includes a widened area for engaging the respective one space of said first space and said second space between said respective pairs of upstanding legs of said first clip with a wedging action to tighten engagement and resist rotation between said clips when said clips are fully assembled.

25. The clip assembly of claim 24 wherein the other of said first space and said second space which is not engaged by said at least one of said upstanding leg and said narrower leg including said widened area has a narrowed area engaged by the other of said upstanding leg and said narrower leg which does not include said widened area when said clips are fully assembled.

26. The clip assembly of claim 24 wherein each of said upstanding leg connected to said second mounting flange of said second clip and said narrower leg extends at an angle to and is connected to said second engagement section at a corner, said widened area being located at said corner of said one upstanding leg or narrower leg.

27. The clip assembly of claim 25 wherein one of said first and second spaces between said upstanding legs of said first clip has a narrowed area engaged by the respective one of said upstanding leg connected to said second mounting flange of said second clip and said narrower leg with a wedging action to tighten engagement and resist rotation between said clips when said clips are fully assembled.

28. The clip assembly of claim 23 including a shoulder between said narrower leg and said one portion of said second engagement section of said second clip, said shoulder engaging one leg of said second pair of upstanding legs of said first clip to limit said telescoping movement of said engagement sections when said first and second clips are fully assembled.

29. The clip assembly of claim 28 including a second shoulder between said narrower leg and said one portion of said second engagement section of said second clip, said shoulder and second shoulder being spaced on opposite sides of said narrower leg, said second shoulder engaging the other leg of said second pair of upstanding legs of said first clip when said shoulder engages said one leg of said second pair to limit said telescoping movement of said engagement sections when said first and second clips are assembled.

30. The clip assembly of claim 22 wherein said slot has a tapered slot section including a narrowed portion having a width less than said width of said narrower leg, the width of said slot tapering toward said narrowed portion at said tapered slot section such that as said clips are assembled, said narrower leg passes through said tapered slot section while camming apart those portions of said first engagement section which are adjacent said tapered slot section, and after said narrower leg has fully passed through said tapered slot section and said clips are in said fully assembled position, said narrowed slot portion engages said narrower leg of said second clip to resist disassembly of said clips.

31. A clip assembly for forming a joint structure to secure a first joint member to a second joint member, said clip assembly comprising:

a first clip having a pair of spaced first mounting portions for attachment to the first joint member, a first engagement section offset from and connected to said first mounting portions, and a slot extending along said engagement section, said slot having a first portion with a predetermined width;

a second clip adapted for attachment to the second joint member and for assembly with said first clip, said second clip having a pair of spaced second mounting portions, and a second engagement section offset from and connected to said second mounting portions, at least one portion of said second engagement section having a width greater than said first portion of said slot;

at least one of said first and second engagement sections having a resilient, flexible, inclined area;

whereby when said first clip is assembled to the first joint member, said second clip is assembled to the second joint member, and said second clip is assembled to said first clip through said slot of said first engagement section, said first and second engagement sections engage one another with said one portion of said second engagement section overlying said slot of said first engagement section while said at least one resilient, flexible, inclined area urges the first and second joint members toward one another to form a tight, secure joint;

said first and second engagement sections being generally coextensive with one another along their lengths when said clips are fully assembled;

said first engagement section including two ends, a first support member at one end joined to one of said first mounting portions, and a second support member at the other end joined to the other of said first mounting portions, said slot extending into said support members at each end of said first engagement section; said second engagement section including two ends, a third support member at one end joined to one of said second mounting portions, and a fourth support member at the other end joined to the other of said second mounting portions, said first and third support members engaging one another and said second and fourth support members engaging one another; and said third support member being received in said slot in said first support member and said fourth support member being received in said slot in said second support member when said clips are fully assembled.

32. A clip assembly for forming a joint structure to secure a first joint member to a second joint member, said clip assembly comprising:

a first clip having a pair of spaced first mounting portions for attachment to the first joint member, a first engagement section offset from and connected to said first mounting portions, and a slot extending along said engagement section, said slot having a first portion with a predetermined width;

a second clip adapted for attachment to the second joint member and for assembly with said first clip; said second clip having a pair of spaced second mounting portions, and a second engagement section offset from and connected to said second mounting portions, at least one portion of said second engagement section having a width greater than said first portion of said slot;

at least one of said first and second engagement sections having a resilient, flexible, inclined area;

whereby when said first clip is assembled to the first joint member, said second clip is assembled to the second joint member, and said second clip is assembled to said first clip through said slot of said first engagement section, said first and second engagement sections engage one another with said one portion of said second engagement section overlying said slot of said first engagement section while said at least one resilient, flexible, inclined area urges the first and second joint members toward one another to form a tight, secure joint;

said slot including a tapered slot section through which a portion of said second clip is received upon assembly of said clips, said tapered slot section resisting disassembly of said clips when said clips are fully assembled.

33. The clip assembly of claim 32 wherein said portion of said second clip is a leg connecting one end of said second engagement section to one of said second mounting portions.

34. The clip assembly of claim 33 wherein said leg has a width narrower than said one portion of said second engagement section.

35. The clip assembly of claim 32 wherein said slot includes slot edges which extend generally parallel to one another; said tapered slot section including slot edge portions which engage said portion of said second clip to resist assembly, said slot edge portions extending at an angle to said slot edges.

36. The clip assembly of claim 35 wherein said slot edge portions extend at an angle to said slot edges of between about 5° and about 90°.

37. A clip assembly for forming a joint structure to secure a first joint member to a second joint member, said clip assembly comprising:

a first clip having a pair of spaced first mounting portions for attachment to the first joint member, a first engagement section offset from and connected to said first mounting portions, and a slot extending along said engagement section, said slot having a first portion with a predetermined width;

a second clip adapted for attachment to the second joint member and for assembly with said first clip, said second clip having a pair of spaced second mounting portions, and a second engagement section offset from and connected to said second mounting portions, at least one portion of said second engagement section having a width greater than said first portion of said slot;

an engaging member on at least one of said first and second clips, said engaging member engaging a portion of the other of said first and second clips when said clips are assembled to resist disassembly of said clips;

whereby when said first clip is assembled to the first joint member, said second clip is assembled to the second joint member, and said second clip is assembled to said first clip with said second engagement section received through an area of said slot of said first engagement section, said first and second engagement sections contact and engage one another with said one portion of said second engagement section overlying said one portion of said slot of said first engagement section while said engaging member resists disassembly of said clips.

38. The clip assembly of claim 37 wherein at least one of said first and second engagement sections includes a resilient, flexible, inclined area which urges the first and second joint members together to form a tight, secure joint when said clips are assembled to one another and the joint members.

39. The clip assembly of claim 38 wherein each of said first and second engagement sections comprises a resilient, flexible, inclined area, whereby said inclined areas engage one another upon assembly of said clips.

40. The clip assembly of claim 39 wherein said inclined area of each of said first and second engagement sections is arcuate, curves toward the position of said respective mounting portions, and has an apex intermediate said respective mounting portions, said engagement sections engaging one another at said apexes upon assembly of said clips.

41. The clip assembly of claim 40 wherein each of said first and second engagement sections is formed from a material selected from the group consisting of spring steel and flexible, resilient plastic.

42. The clip assembly of claim 37 wherein said slot includes a second portion which is wider than and communicates with said first portion; said second clip being assembled to said first clip by telescoping movement of said second engagement section by passing said one portion of said second engagement section into engagement with said first engagement section through said second slot portion while said first and second engagement sections move along one another.

43. The clip assembly of claim 42 wherein said second clip includes at least one shoulder which engages a portion of said first clip to limit further of said telescoping movement of said clips such that said first and second engagement sections are generally coextensive with one another along their lengths when said clips are fully assembled.

44. The clip assembly of claim 37 wherein said engaging member includes a locking member on said first clip; said second clip including a receiving portion; said locking member engaging said receiving portion to resist disassembly of said clips when said clips are fully assembled.

45. The clip assembly of claim 44 wherein said locking member is a locking flange aligned with said first engagement section, said locking flange extending from a position spaced from said first engagement section toward said first engagement section.

46. The clip assembly of claim 45 wherein said receiving portion of said second clip includes a receiving area for engaging said locking flange when said clips are fully assembled; said locking flange having a free end engaging said receiving area.

47. The clip assembly of claim 46 wherein said receiving area is a raised protrusion extending outwardly from said second engagement section.

48. The clip assembly of claim 47 wherein said locking flange includes a recess in said free end, said recess receiving said raised protrusion therein.

49. The clip assembly of claim 46 wherein said receiving area includes an aperture in said second engagement section; said locking flange including an extending member received in said aperture.

50. The clip assembly of claim 45 wherein said receiving area includes a plurality of spaced protrusions on said second engagement section.

51. A clip assembly for forming a joint structure to secure a first joint member to a second joint member, said clip assembly comprising:
   a first clip having a pair of spaced first mounting portions for attachment to the first joint member, a first engagement section offset from and connected to said first mounting portions, and a slot extending along said engagement section, said slot having a first portion with a predetermined width;
   a second clip adapted for attachment to the second joint member and for assembly with said first clip, said second clip having a pair of spaced second mounting portions, and a second engagement section offset from and connected to said second mounting portions, at least one portion of said second engagement section having a width greater than said first portion of said slot;
   an engaging member on at least one of said first and second clips, said engaging member engaging a portion of the other of said first and second clips when said clips are assembled to resist disassembly of said clips;
   whereby when said first clip is assembled to the first joint member, said second clip is assembled to the second joint member, and said second clip is assembled to said first clip through said slot of said first engagement section, said first and second engagement sections engage one another with said one portion of said second engagement section overlying said slot of said first engagement section while said engaging member resists disassembly of said clips;
   said engaging member including a tapered section on said slot through which a portion of said second clip is received upon assembly of said clips, said tapered slot section resisting disassembly of said clips when said clips are fully assembled.

52. The clip assembly of claim 51 wherein said portion of said second clip is a leg connecting one end of said second engagement section to one of said second mounting portions.

53. The clip assembly of claim 52 wherein said leg has a width narrower than said one portion of said second engagement section.

54. The clip assembly of claim 51 wherein said slot includes slot edges which extend generally parallel to one another; said tapered slot section including slot edge portions which engage said portion of said second clip to resist assembly, said slot edge portions extending at an angle to said slot edges.

55. The clip assembly of claim 54 wherein said slot edge portions extend at an angle to said slot edges of between about 5° and about 90°.

56. A joint assembly forming a joint structure in which a first joint member is secured to a second joint member, said joint assembly comprising:
   a first joint member and a second joint member;
   a clip assembly including a first clip having a pair of spaced first mounting portions secured to said first joint member, a first engagement section offset from and connected to said first mounting portions, and a slot extending along said engagement section, said slot having a first portion with a predetermined width, a second clip for assembly with said first clip, and having a pair of spaced second mounting portions secured to said second joint member, and a second engagement section offset from and connected to said second mounting portions, at least one portion of said second engagement section having a width greater than said first portion of said slot; and
   at least one of said first and second engagement sections having a resilient, flexible, inclined area;
   said second clip being assembled to said first clip through said slot of said first engagement section with said one portion of said second engagement section received through an area of said slot of said first engagement section, said first and second engagement sections contacting and engaging one another with said one portion of said second engagement section overlying said first portion of said slot of said first engagement section while said at least one resilient, flexible, inclined area urges said first and second joint members toward one another to form a tight, secure joint between said joint members.

57. The joint assembly of claim 56 wherein each of said first and second joint members includes an engaging surface thereon for engagement with the other joint member when said clips are assembled, one of said first and second joint members including a recess in said engaging surface, the respective one of said first and second clips of said one first or second joint member which includes said recess being secured within said recess, the other of said first and second clips being received within said recess and engaging said one respective clip such that said clips are substantially hidden from view by said first and second members when said clips are assembled.

58. The joint assembly of claim 57 wherein said recess includes an opening thereto through another surface of said one joint member which is adjacent said engaging surface in which said recess is located.

59. The joint assembly of claim 57 wherein said one clip which is secured in said recess has a predetermined width; said recess having a width which is greater than said predetermined width of said one clip with a range of between about 3% and about 5%.

60. The joint assembly of claim 57 wherein said recess has a predetermined depth; each of said clips having substantially the same height dimension which is less than said recess depth; said recess depth being within a range of between about 50% and about 63% greater than said clip height dimension.

61. The joint assembly of claim 56 wherein first clip further includes a locking member for engaging a receiving portion of said second clip and resisting disassembly when said clips are fully assembled.

62. A joint assembly forming a joint structure in which a first joint member is secured to a second joint member, said joint assembly comprising:

a first joint member and a second joint member;

a clip assembly including a first clip having a pair of spaced first mounting portions secured to said first joint member, a first engagement section offset from and connected to said first mounting portions, and a slot extending along said engagement section, said slot having a first portion with a predetermined width, a second clip for assembly with said first clip, and having a pair of spaced second mounting portions secured to said second joint member, and a second engagement section offset from and connected to said second mounting portions, at least one portion of said second engagement section having a width greater than said first portion of said slot; and at least one of said first and second engagement sections having a resilient, flexible, inclined area;

said second clip being assembled to said first clip through said slot of said first engagement section, said first and second engagement sections engaging one another with said one portion of said second engagement section overlying said slot of said first engagement section while said at least one resilient, flexible, inclined area urges said first and second joint members toward one another to form a tight, secure joint between said joint members;

each of said first and second joint members including an engaging surface thereon for engagement with the other joint member when said clips are assembled, one of said first and second joint members including a recess in said engaging surface, the respective one of said first and second clips of said one first or second joint member which includes said recess being secured within said recess, the other of said first and second clips being received within said recess and engaging said one respective clip such that said clips are substantially hidden from view by said first and second members when said clips are assembled;

said recess including an opening thereto through another surface of said one joint member which is adjacent said engaging surface in which said recess is located, said opening through said another surface of said one joint member receiving said other of said first and second clips for engagement with said one clip when said clips are assembled.

63. A joint assembly forming a joint structure in which a first joint member is secured to a second joint member, said joint assembly comprising:

a first joint member and a second joint member;

a clip assembly including a first clip having a pair of spaced first mounting portions secured to said first joint member, a first engagement section offset from and connected to said first mounting portions, and a slot extending along said engagement section, said slot having a first portion with a predetermined width, a second clip for assembly with said first clip, and having a pair of spaced second mounting portions secured to said second joint member, and a second engagement section offset from and connected to said second mounting portions, at least one portion of said second engagement section having a width greater than said first portion of said slot; and at least one of said first and second engagement sections having a resilient, flexible, inclined area;

said second clip being assembled to said first clip through said slot of said first engagement section, said first and second engagement sections engaging one another with said one portion of said second engagement section overlying said slot of said first engagement section while said at least one resilient, flexible, inclined area urges said first and second joint members toward one another to form a tight, secure joint between said joint members;

each of said first and second joint members including an engaging surface thereon for engagement with the other joint member when said clips are assembled, one of said first and second joint members including a recess in said engaging surface, the respective one of said first and second clips of said one first or second joint member which includes said recess being secured within said recess, the other of said first and second clips being received within said recess and engaging said one respective clip such that said clips are substantially hidden from view by said first and second members when said clips are assembled;

said recess including an opening thereto through another surface of said one joint member which is adjacent said engaging surface in which said recess is located, said recess being located in said first joint member and said first clip is secured within said recess; said second clip being secured to said engaging surface of said second joint member.

64. The joint assembly of claim 63 wherein said slot includes a second portion which is wider than and communicates with said first portion; said second clip being assembled to said first clip by telescoping said second engagement section into engagement with said first engagement section through said second slot portion; said first clip being secured in said recess with said second slot portion facing said recess opening to said another surface of said first joint member.

65. The joint assembly of claim 64 wherein said second clip includes a leg connecting one end of said second engagement section to one of said second mounting portions, said leg having a width narrower than said one portion of said second engagement section; said second clip being assembled to said first clip by telescoping said narrower leg initially through said second slot portion and then through said slot.

66. A joint assembly forming a joint structure in which a first joint member is secured to a second joint member, said joint assembly comprising:

a first joint member and a second joint member;

a clip assembly including a first clip having a pair of spaced first mounting portions secured to said first joint member, a first engagement section offset from and connected to said first mounting portions, and a slot extending along said engagement section, said slot having a first portion with a predetermined width, a second clip for assembly with said first clip, and having a pair of spaced second mounting portions secured to said second joint member, and a second engagement section offset from and connected to said second mounting portions, at least one portion of said second engagement section having a width greater than said first portion of said slot; and at least one of said first and second engagement sections having a resilient, flexible, inclined area;

said second clip being assembled to said first clip through said slot of said first engagement section, said first and second engagement sections engaging one another with said one portion of said second engagement section overlying said slot of said first engagement section while said at least one resilient, flexible, inclined area urges said first and second joint members toward one another to form a tight, secure joint between said joint members;

said slot including a tapered slot section through which a portion of said second clip is received upon assembly of said clips, said tapered slot section resisting disassembly of said clips when said clips are fully assembled.

67. A joint assembly for forming a joint structure in which a first joint member is secured to a second joint member, said joint assembly comprising:

a first joint member and a second joint member;

a clip assembly including a first clip having a pair of spaced first mounting portions secured to said first joint member, a first engagement section offset from and connected to said first mounting portions, and a slot extending along said engagement section, said slot having a first portion with a predetermined width, a second clip secured to said second joint member for assembly with said first clip and having a pair of spaced second mounting portions, and a second engagement section offset from and connected to said second mounting portions, at least one portion of said second engagement section having a width greater than said first portion of said slot;

an engaging member on at least one of said first and second clips, said engaging member engaging a portion of the other of said first and second clips when said clips are assembled to resist disassembly of said clips and said joint structure;

said second clip being assembled to said first clip with said second engagement section received through an area of said slot of said first engagement section, said first and second engagement sections contacting and engaging one another with said one portion of said second engagement section overlying said one portion of said slot of said first engagement section while said engaging member resists disassembly of said clips and joint structure.

68. A clip assembly for forming a joint structure to secure a first joint member to a second joint member, said clip assembly comprising:

a first clip having at least one first mounting portion for attachment to the first joint member, a first engagement section offset from and connected to said first mounting portion, and a slot extending along said engagement section, said slot having a first portion with a predetermined width;

a second clip adapted for attachment to the second joint member and for assembly with said first clip, said second clip having at least one second mounting portion, and a second engagement section offset from and connected to said second mounting portion, at least one portion of said second engagement section having a width greater than said first portion of said slot;

at least one of said first and second engagement sections having a resilient, flexible, inclined area;

whereby when said first clip is assembled to the first joint member, said second clip is assembled to the second joint member, and said second clip is assembled to said first clip with said second engagement section received through an area of said slot of said first engagement section, said first and second engagement sections contact and engage one another with said one portion of said second engagement section overlying said one portion of said slot of said first engagement section while said at least one resilient, flexible, inclined area urges the first and second joint members toward one another to form a tight, secure joint.

* * * * *

UNITED STATES PATENT AND TRADEMARK OFFICE
CERTIFICATE OF CORRECTION

PATENT NO. : 6,588,971 B2 Page 1 of 1
APPLICATION NO. : 09/946019
DATED : July 8, 2003
INVENTOR(S) : Montgomery J. Welch and Kevin M. Wigger It is certified that error appears in the above-identified patent and that said Letters Patent is hereby corrected as shown below:

Column 2:
Line 23, Delete "at least one and preferably" after "having".
Line 28, Insert --pair of-- before "first".
Line 28, Delete "portion or" after "mounting".
Line 30, Delete "at" after "has".
Line 31, Delete "least one, and preferably" before "a".
Line 33, Delete "portion or" before "portions".

Column 16:
Line 11, Claim 27, "25" should be --23--.

Column 17:
Line 40, Claim 32, ";" should be --,-- after "clip".

Signed and Sealed this

Second Day of June, 2009

JOHN DOLL
*Acting Director of the United States Patent and Trademark Office*